Aug. 16, 1955 A. E. FELT 2,715,446
BALANCE ASSEMBLY FOR AIRCRAFT BLADES
Filed March 24, 1951
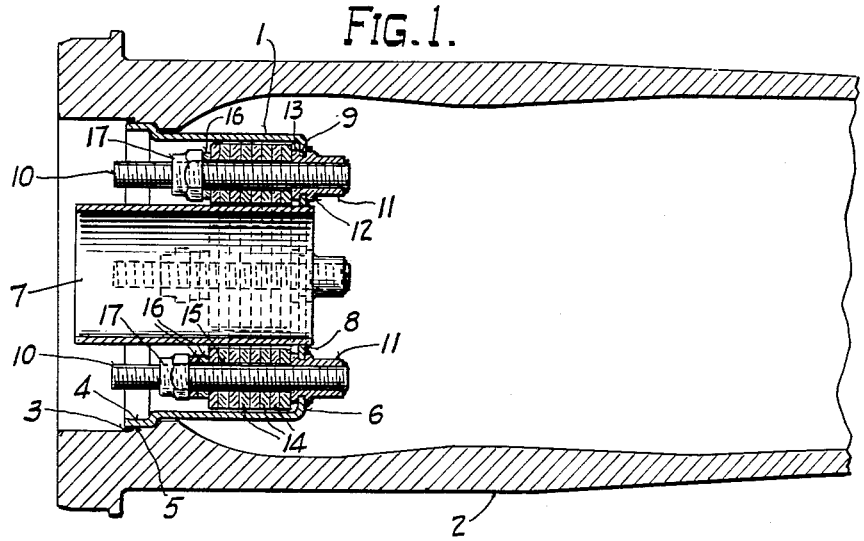
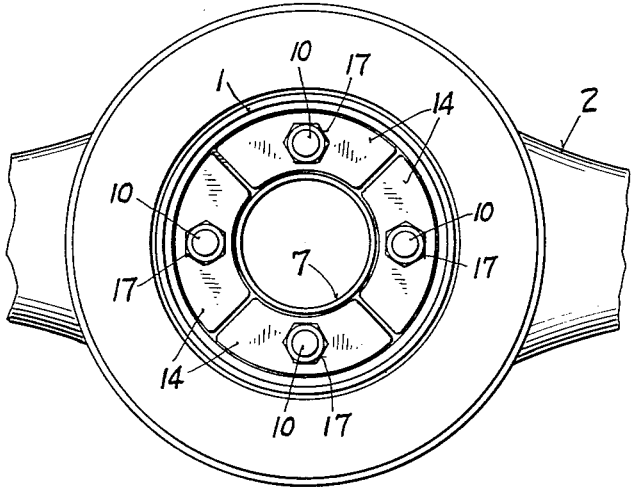
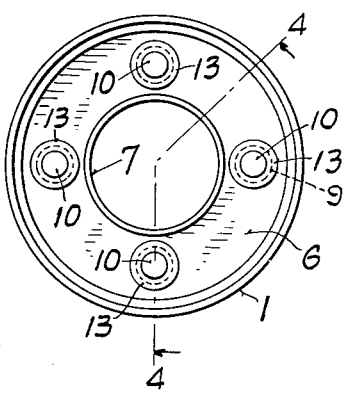
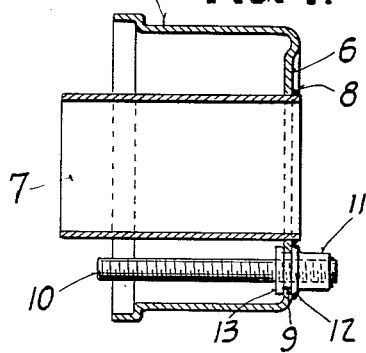
INVENTOR.
Adolph E. Felt
BY Andrus & Sceales
ATTORNEYS.

United States Patent Office 2,715,446
Patented Aug. 16, 1955

2,715,446

BALANCE ASSEMBLY FOR AIRCRAFT BLADES

Adolph E. Felt, Milwaukee, Wis., assignor to A. O. Smith Corporation, Milwaukee, Wis., a corporation of New York Application March 24, 1951, Serial No. 217,326

2 Claims. (Cl. 170—159)

This invention relates generally to a balance assembly for blades for aircraft and more particularly to a balance assembly for balancing blades for aircraft that are adapted to receive a heated medium within the interior thereof to remove ice from the blade or blades while in flight. Specifically the balance assembly of the invention is employed after the blade has been initially balanced to within certain tolerance limits to obtain substantially the optimum of balance of the blade within the tolerance limits initially established.

The principal object of the invention is to provide a balance assembly for disposition within the root end or shank of the blade, and which is of a construction adaptable to permit a heated medium such as gas or air, to pass therethrough to the interior of the blade to effect the removal of ice from the blade. The assembly of the invention is effectual in balancing the blade on both its vertical and horizontal axes.

Another object is to provide a balance assembly for aircraft blades which is relatively inexpensive and easily assembled within the blade.

Another object is to provide a balance assembly for aircraft blades which is easily accessible from the interior of the shank of the blade, when the blade is being serviced, so that certain elements of the assembly may be removed or added, to balance the blade for future use.

A further object is to provide a balance assembly for aircraft blades for balance in both vertical and horizontal axes in which the balancing weights are disposed on a plurality of studs which are longitudinally disposed with relation to the major axis of the blade and parallel thereto.

A still further object is to provide a balance assembly for aircraft blades in which balance on the horizontal axis may be obtained by employing segmental balancing units in multiples of two in combination with a suitable plurality of washers, and in which balance on the vertical axis may be obtained by employing one or more individual segments, and if desirable, in combination with one or more washers.

The invention in general is directed to a balance assembly comprising a cup secured within the shank of a propeller blade within which extend four circumferentially equally spaced studs which receive segments that are clamped to the cup by stop nuts threaded onto the studs. The segments may form an interrupted circular ring for vertical and horizontal balance correction of the blade or may be employed on only a single stud to mainly correct horizontal unbalance in a portion of the blade be it in the foils or edges of the blade. Washers can also be used for obtaining vertical balance correction. A central tube is secured within the balance assembly inside the studs and permits a heating medium to pass through the assembly and into the blade to effect de-icing.

Other objects and advantages of the invention will appear hereinafter in connection with the description of an embodiment of the invention illustrated in the accompanying drawing.

Figure 1 is a longitudinal sectional view of the balance assembly of the invention secured in the root end or shank of a propeller blade;

Fig. 2 is an end elevational view of the balance assembly of the invention as viewed from the left in Figure 1;

Fig. 3 is an end elevational view of the balance assembly without the segmental balance units;

Fig. 4 is a view taken on line 4—4 of Fig. 3 and showing one stud secured to an end wall of the balance cup; and Fig. 5 is a perspective view of one of the balance segments.

According to the invention the aircraft blade assembly comprises a generally cylindrical shaped cup 1 secured in the root end or shank of a propeller blade 2, preferably as by a solder ring 3 disposed between the circumferential flange 4 of the cup and an inwardly disposed circumferential shoulder 5 on the inner surface of the shank of the blade, the ring 3 serving to braze or solder the cup to the blade as the solder seeps into the joint when it is initially heated. The cup 1 has a flanged inner end 6 through which is disposed an open-end cylindrical diffuser tube 7 of generally cylindrical shape, the horizontal axes of the cup and the tube coinciding with each other and with the longitudinal axis of the shank of the blade. One end of tube 7 extends longitudinally beyond end 6 and the tube is preferably secured to the inner end of the cup circumferentially by a weld 8. The opposite end of the diffuser tube extends longitudinally beyond the open end of the cup.

End 6 of cup 1 is provided with a plurality of equally spaced apertures 9 which are disposed to each receive a threaded stud 10 therethrough. The inner ends of the studs are secured to the end 6 by deformable nuts 11, which when deformed, provide circumferentially disposed flanges 12, and which in combination with the base 13 of the nuts 11, circumferentially grip the end 6 of the cup. The contacting surfaces of the studs 10 and the nuts 11 are locked together by permitting solder, preferably silver brazing solder, to seep between the inner surfaces of the nuts and the studs. Likewise the studs, together with the nuts, are further secured to the end wall 6 by disposing silver solder between the end wall and the grooves formed by the flanges 12 and the bases 13 of the nut.

Balancing segments 14 are each provided with an aperture 15 which is of sufficient diameter to be freely disposed over the threads of studs 10. The apertures are centered with respect to all edges of the segments and each segment comprises generally one quarter of a circle so that when they are employed in multiples of four the result is to provide a generally circular balance weight. A predetermined plurality of washers 16 are disposed on the studs 10, outwardly of the segmental balances 14 and the segments and the washers are held in locked position against the bases 13 by stop nuts 17.

The segmental balance units 14, being loosely mounted on the studs 10, are free to rest circumferentially on the outer surface of the diffuser tube or on the inner surface of the balance cup so that when the stop nuts 17 are set up to the required amount on the studs certain of the segmental balance units may rest circumferentially on the diffuser tube and certain other of the balance units may rest circumferentially on the balance cup. The segments may be applied over the studs by hand or if preferred they may be applied by a mechanical device such as a jig or suction cup. On the other hand the balance units may be disposed in the cup after the cup has been secured to the shank of the blade or the balance units may be disposed in the balance cup before the same is secured in the shank. The entire assembly would be installed as a unit in the latter instance.

The device of this invention is generally employed after a blade is first placed in an appropriate balancing machine and a measurement made for a horizontal moment. The blade is then placed in a second balancing machine where a measurement is made for a vertical moment. From these measurements a calculation may be made to show the amount of unbalance and to correct for this, a predetermined number and arrangement of segments are placed over the studs 10 to compensate for any combined horizontal and vertical unbalance in the blade. To effect a substantially fine horizontal balance, washers 16 may be used.

Vertical balance correction is checked between the leading and trailing edges and between the thrust and camber foils of the blade. As an example of the manner in which the device of this invention may be used, and with reference to Fig. 2 of the drawing the upper stud is generally aligned substantially parallel to the trailing edge, the next stud, reading clockwise, is aligned substantially parallel to the camber foil, the lowermost stud is aligned substantially parallel to the leading edge, and the last or fourth stud is aligned substantially parallel to the thrust foil. While measuring the vertical balance characteristics of the blade, if it is found that the blade does not have the required balance moment on the leading edge for example, individual segments may be added to the leading edge stud to bring the blade into proper balance. Likewise if the blade does not have the required balance moment on the camber foil, individual segments may be added to the camber foil stud.

The utilization of a plurality of studs disposed within the balance cup as above described provides means whereby the properly selected balance elements may be placed in proper position with great facility, and without interfering with the central diffuser through which a heated medium is admitted to the blade.

Various embodiments of the invention may be employed within the scope of the following claims.

I claim:

1. A balance assembly for a propeller blade, comprising a cup member adapted to be secured coaxially within the longitudinal bore of the shank of the blade with the bottom of said cup member disposed inwardly toward the tip of the blade, a hollow tube disposed longitudinally centrally of the cup member, said tube extending through the bottom of the cup member and being secured thereto to provide a passageway into the blade interior for a heated medium, a plurality of studs each secured to the bottom of the cup member and extending longitudinally of the cup member at cardinal locations corresponding substantially to the leading edge, the trailing edge, the center line of the thrust surface, and the center line of the camber surface of the propeller blade, respectively, said studs being spaced radially outwardly a predetermined distance from the hollow tube, a plurality of segments removably mounted on each stud and contoured for disposal within the cup member outwardly from the hollow tube to effect vertical and horizontal balance of the blade, said segments being adapted to be disposed individually on predetermined selected studs to effect further balance of the blade in accordance with measurements of balance movements thereof, and means removably secured on said studs to retain the segments in place.

2. A balance assembly for a propeller blade, comprising a cylindrical cup member secured coaxially within the longitudinal bore of the shank of the blade with the bottom of said cup member disposed inwardly toward the tip of the blade, a cylindrical tube disposed longitudinally centrally of the cup member, said tube extending through the bottom of the cup member and being secured circumferentially thereto to provide a passageway through the tube into the blade interior for a heated medium and an annular recess between the tube and the cup member, a plurality of threaded studs each secured to the bottom of the cup member and extending longitudinally of the cup member at cardinal locations corresponding substantially to the leading edge, the trailing edge, the center line of the thrust surface, and the center line of the camber surface of the propeller blade, respectively, said studs being spaced radially outwardly a predetermined distance from the cylindrical tube, a plurality of arcuate segments mounted on each stud and contoured for disposal within the annular recess between the cylindrical tube and the cup member to effect vertical and horizontal balance of the blade, said segments being adapted to be disposed individually on predetermined selected studs to effect further balance of the blade in accordance with measurements of balance moments thereof, and stop nuts threaded onto the outer ends of the studs to retain the arcuate segments in place.

References Cited in the file of this patent

UNITED STATES PATENTS

| | | |
|---|---|---|
| 2,465,007 | Bragdon et al. | Mar. 22, 1949 |
| 2,494,756 | Gruetjen | Jan. 17, 1950 |
| 2,541,661 | Palmatier et al. | Feb. 13, 1951 |
| 2,552,727 | Lightfoot | May 15, 1951 |
| 2,553,218 | Stuart III et al. | May 15, 1951 |